(12) United States Patent
Spuhler et al.

(10) Patent No.: US 12,508,157 B2
(45) Date of Patent: Dec. 30, 2025

(54) MEDICAL DEVICE FOR EYE SURGERY

(71) Applicants: UNIVERSITE DE MONTPELLIER, Montpellier (FR); CENTRE NATIONAL DE LA RECHERCHE SCIENTIFIQUE (CNRS), Paris (FR); ACUSURGICAL, Montpellier (FR)

(72) Inventors: Christoph Spuhler, Montpellier (FR); Philippe Poignet, Gignac (FR); Yassine Haddab, Montpellier (FR)

(73) Assignees: UNIVERSITE DE MONTPELLIER, Montpellier (FR); CENTRE NATIONAL DE LA RECHERCHE SCIENTIFIQUE (CNRS), Paris (FR); ACUSURGICAL, Montpellier (FR)

( * ) Notice: Subject to any disclaimer, the term of this patent is extended or adjusted under 35 U.S.C. 154(b) by 1156 days.

(21) Appl. No.: 17/298,891

(22) PCT Filed: Dec. 5, 2019

(86) PCT No.: PCT/EP2019/083900
§ 371 (c)(1),
(2) Date: Jun. 1, 2021

(87) PCT Pub. No.: WO2020/115249
PCT Pub. Date: Jun. 11, 2020

(65) Prior Publication Data
US 2022/0031502 A1    Feb. 3, 2022

(30) Foreign Application Priority Data
Dec. 6, 2018  (FR) .................................. FR1872462

(51) Int. Cl.
*A61B 5/00*    (2006.01)
*A61B 34/20*   (2016.01)
(Continued)

(52) U.S. Cl.
CPC .............. *A61F 9/007* (2013.01); *A61B 34/20* (2016.02); *A61B 34/32* (2016.02); *G16H 20/40* (2018.01);
(Continued)

(58) Field of Classification Search
CPC . A61B 34/20; A61B 34/32; A61B 2034/2065; A61B 2090/3735
See application file for complete search history.

(56) References Cited

U.S. PATENT DOCUMENTS

2015/0272697 A1* 10/2015 Shi ........................ A61B 5/0066
600/424
2015/0335480 A1* 11/2015 Alvarez ................... A61B 3/13
606/130

(Continued)

FOREIGN PATENT DOCUMENTS

WO    WO 2017/044965 A1    3/2017
WO    WO 2017/162981 A1    9/2017

OTHER PUBLICATIONS

International Search Report and Written Opinion for corresponding PCT Application No. PCT/EP2019/083900, mailed Feb. 19, 2020, 9pp.

(Continued)

*Primary Examiner* — Joel F Brutus
(74) *Attorney, Agent, or Firm* — Womble Bond Dickinson (US) LLP

(57) ABSTRACT

A control unit for a surgical device, said surgical device (2) comprising:
at least one surgical tool comprising an end, called distal, adapted to come into contact with a patient (5), and adapted to be positioned in the patient (5),
at least one robotic mobile element (7) on which the surgical tool is mounted, the robotic mobile element (7) being adapted to move said surgical tool,
(Continued)

at least one depth imaging tool (8) adapted to acquire a depth image (22) at an acquisition area on the patient (5), said imaging tool (8) being adapted to move the acquisition area on the patient (5), said control unit (1) being adapted to send information to the at least one robotic mobile element (7) and/or the imaging tool (8) so that the position of the acquisition area substantially coincides with the position of the distal end of the surgical tool.

16 Claims, 4 Drawing Sheets

(51) Int. Cl.
*A61B 34/32* (2016.01)
*A61F 9/007* (2006.01)
*G16H 20/40* (2018.01)
*G16H 30/40* (2018.01)
*A61B 90/00* (2016.01)
*A61B 90/20* (2016.01)

(52) U.S. Cl.
CPC ...... *G16H 30/40* (2018.01); *A61B 2034/2065* (2016.02); *A61B 90/20* (2016.02); *A61B 2090/3735* (2016.02)

(56) References Cited

U.S. PATENT DOCUMENTS

| | | | |
|---|---|---|---|
| 2016/0095752 A1* | 4/2016 | Srinivasan | A61F 9/00834 606/6 |
| 2016/0100898 A1* | 4/2016 | Jinno | A61B 34/37 606/130 |
| 2016/0158938 A1* | 6/2016 | Gombert | B25J 9/1676 901/30 |
| 2017/0209042 A1 | 7/2017 | Matz et al. | |
| 2019/0099222 A1 | 4/2019 | Nahum et al. | |

OTHER PUBLICATIONS

Carrasco-Zevallos et al., "Review of intraoperative optical coherence tomography: technology and applications [Invited]", Biomedical Optics Express, vol. 8, No. 3, Feb. 21, 2017, pp. 1607-1637, XP055487817, DOI: 10.1364/BOE.8.001607, ISSN:2156-7085.

Zhou et al., "Towards Robotic Eye Surgery: Marker-free, Online Hand-eye Calibration using Optical Coherence Tomography Images", IEEE Robotics and Automation Letters, (arxiv.org) Aug. 2018, 8pp.

Yu et al., "Calibration and Integration of B-Mode Optical Coherence Tomography for Assistive Control in Robotic Microsurgery", Dec. 2016, vol. 21, No. 6, pp. 2613-2623, XP011633558, DOI: 10.1109/TMECH.2016.2583259, ISSN: 1083-4435 [On Order].

Yu et al., "Calibration and Integration of B-Mode Optical Coherence Tomography for Assistive Control in Robotic Microsurgery", Dec. 2016, vol. 21, No. 6, pp. 2613-2623, XP011633558, DOI: 10.1109/TMECH.2016.2583259, ISSN: 1083-4435.

* cited by examiner

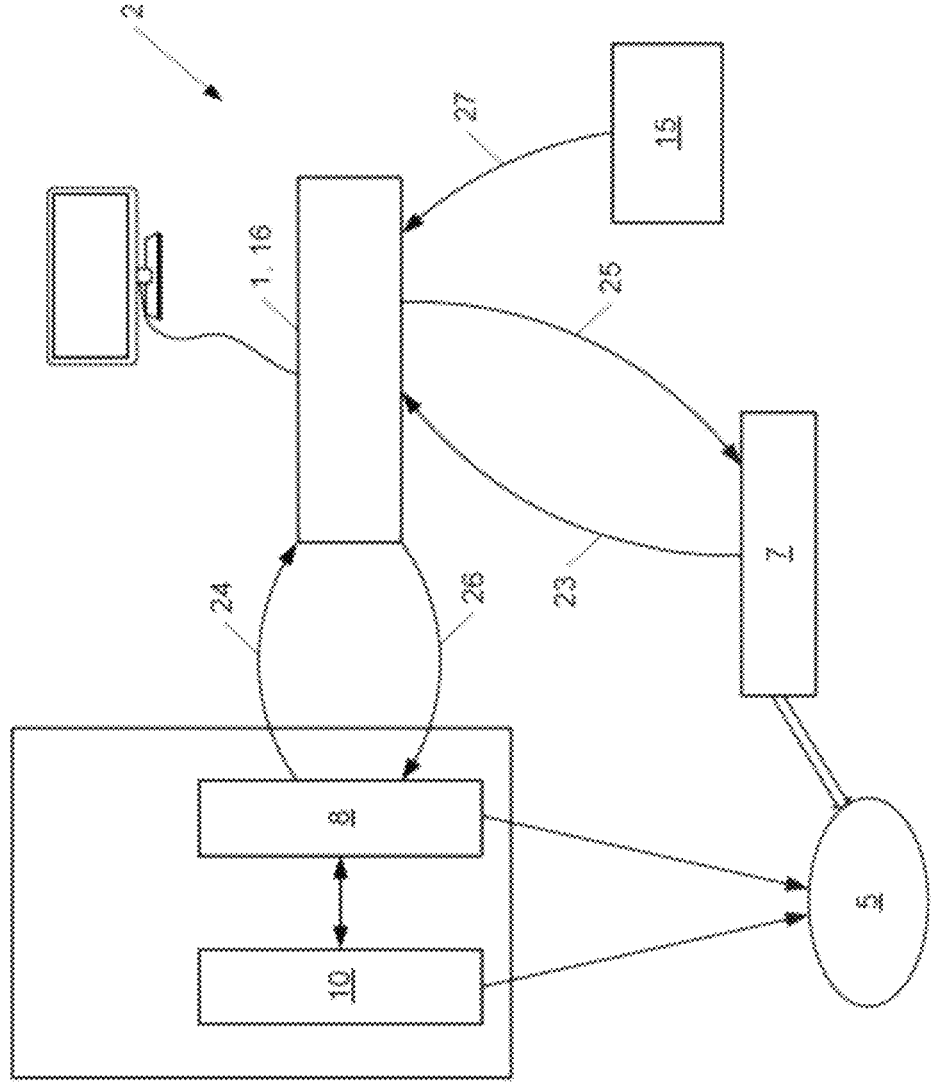
[Fig. 1]

[Fig.2]
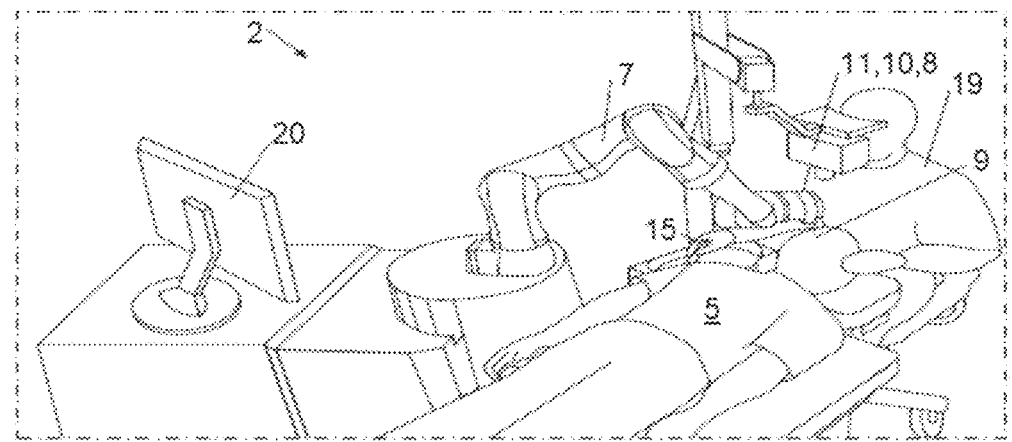
[Fig.3]
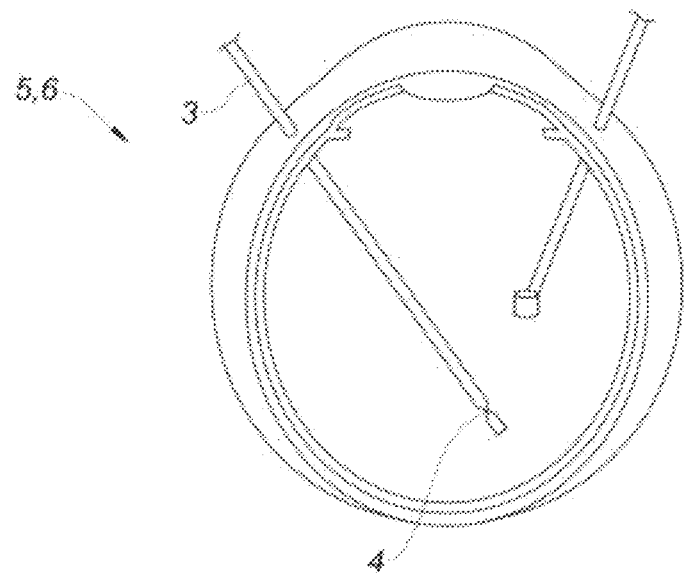

[Fig.4a]
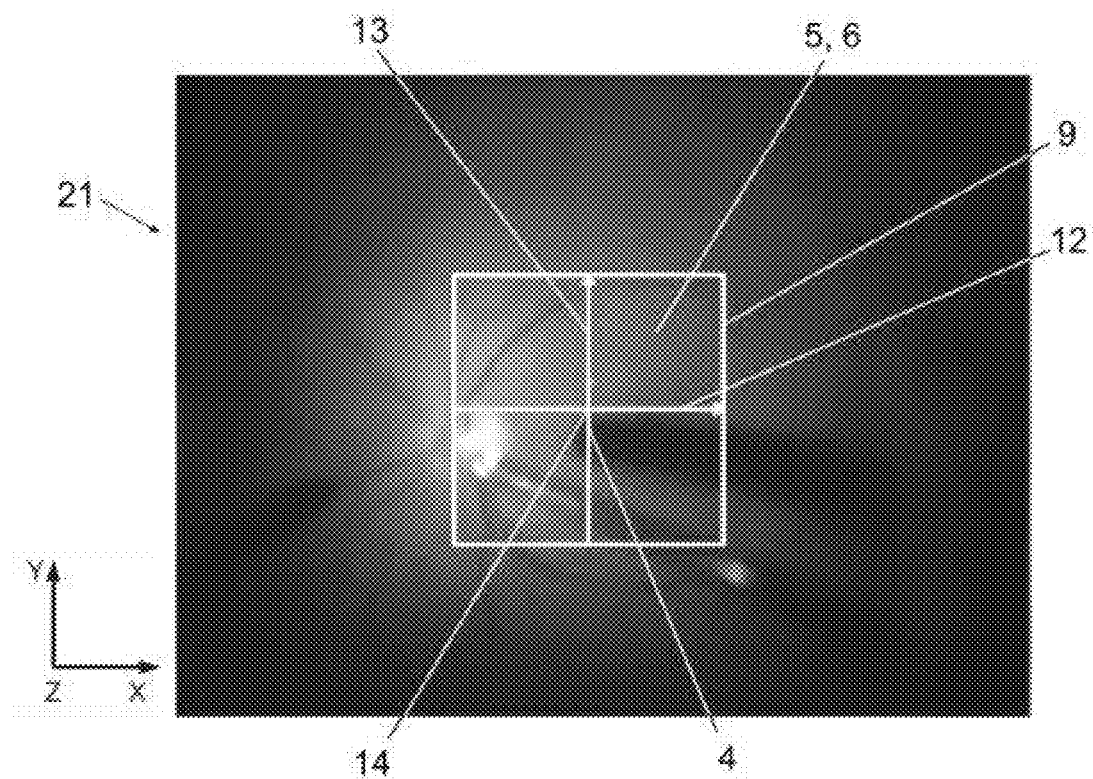
[Fig.4b]
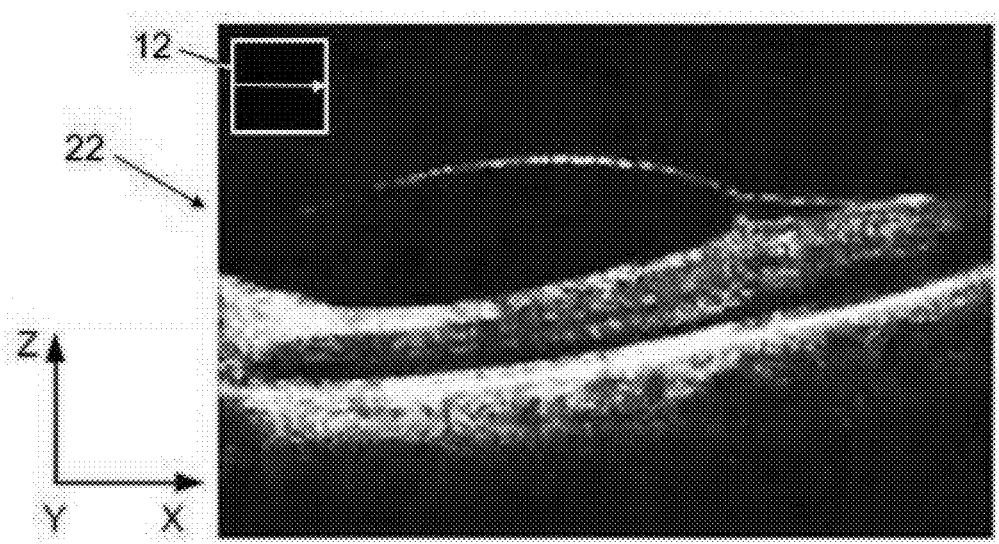

[Fig.4c]
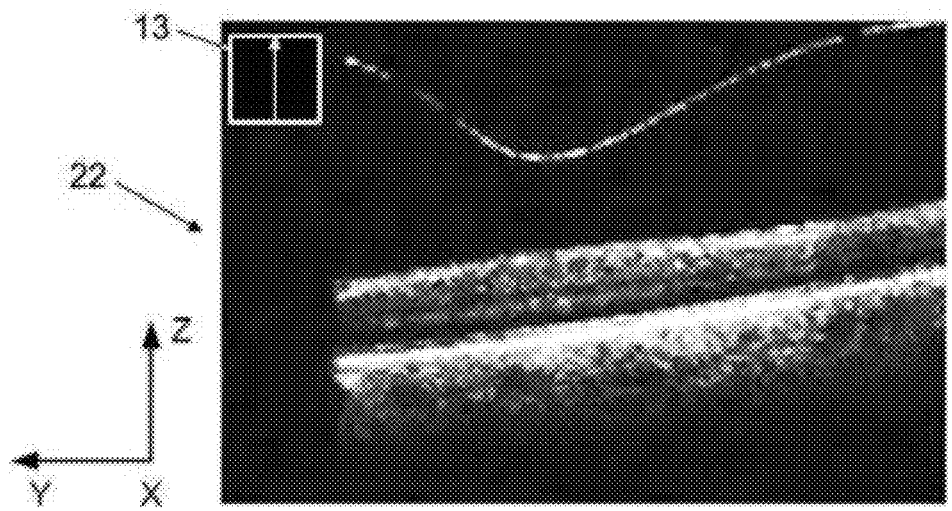
[Fig.5]
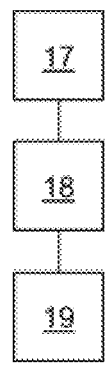
[Fig.6]
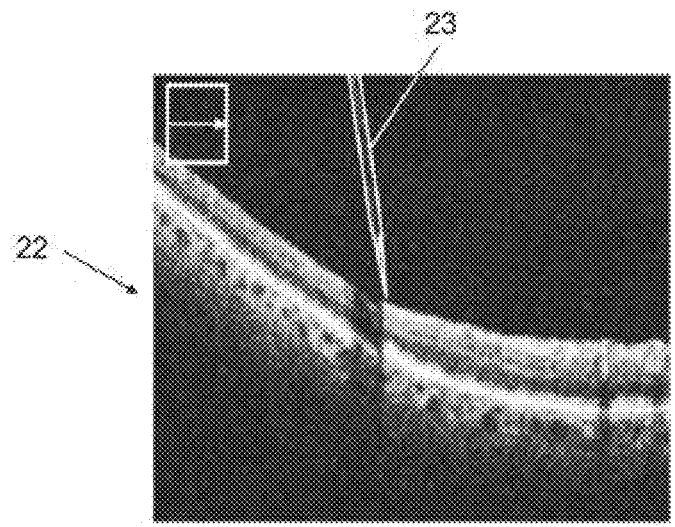

MEDICAL DEVICE FOR EYE SURGERY

CROSS-REFERENCE TO RELATED APPLICATIONS

This application is a U.S. National Phase Patent Application of International Application Number PCT/EP2019/083900, filed on Dec. 5, 2019, which claims priority to French Patent Application Number FR1872462, filed on Dec. 6, 2018, the entire contents of each of which are incorporated herein by reference.

TECHNICAL FIELD OF THE INVENTION

The invention relates to surgical methods and devices. In particular to surgical methods and devices for eye surgery.

Eye surgery is a delicate procedure. The surgical tools used have dimensions (in the order of a few hundred of micrometres) adapted to the surgical area and are moved into the eye, over the surgical area to be treated, the surface of which extends from a few square millimetres to about one square centimetre.

Some procedures require tools to be inserted inside the eye. This is the case in particular for the retinal surgery, which requires the insertion of several surgical tools through the vitreous body to reach the retina, which lines the back of the eye.

A surgical procedure requires the use of a surgical device which comprises:
- at least one surgical tool,
- imaging systems,
- a screen to display the images obtained from the imaging systems.

The imaging systems comprise an ophthalmic microscope to visualise the surface of the retina on the one hand, and an imager allowing to obtain an image by optical coherence tomography located in the field of the image of the ophthalmic microscope, known by the acronym OCT on the other hand. The OCT image is a depth view of the eye. More precisely, it is a cross-sectional view of the eye along one or more cutting axes, i.e. in two dimensions, which allows the anatomical structures of the retina to be visualised in depth. The image obtained by OCT is displayed on the screen or in the ophthalmic microscope. The ophthalmic microscope and the OCT imager provide important and complementary information to the surgeon.

Other depth imaging techniques on a slice are known from the prior art. Ultrasound, SM-OCT (Speckle-Modulating OCT), SS-OCT (Swept-Source OCT), SD-OCT (Spectral-Domain OCT) or OCTA (OCT Angiography) are imaging techniques that provide a depth view of the eye and more specifically a cross-sectional view of the eye along one or more cutting axes.

During the procedure, the surgical tool is inserted inside the eye and passes through the vitreous body. The end of the surgical tool is brought into contact with the surgical area. During the procedure, the surgeon manoeuvres the surgical tool over the surgical area. In order to guide the end of the surgical tool, the surgeon needs to visualise the anatomical structures where the end of the surgical tool is located, and therefore moves the cutting axis of the OCT imager so that the acquired OCT image is permanently coincident with the end of said surgical tool. This allows the anatomical structures at the end of the surgical tool to be visualised on the screen during the procedure. The surgeon must move the OCT cutting axis because the displacement of the end of the surgical tool causes that the field of the OCT imager no longer match the position of the end of said surgical tool.

In practice, the surgeon moves the surgical tool with his or her hand and moves the cutting axis of the OCT imager with a foot or foot joystick control, such as foot pedals or foot joysticks. This is because the surgeon typically uses both hands to manipulate two surgical tools (e.g. a clamp and a candlestick for illumination) and only his or her feet are available to move the OCT cutting axis and to adjust the magnification and the focus of the ophthalmic microscope. One of the difficulties in performing the surgery is therefore related to the simultaneous handling of several surgical instruments and imaging systems.

Another difficulty encountered by the surgeons in this type of procedure is the natural trembling of the hands or the sudden movements, which can be dangerous given the dimensions of the surgical area.

One objective of the invention is to reduce the number of simultaneous manipulations by the surgeon.

Another objective is to limit the consequences that an unwanted movement could have on a patient.

Another objective is to allow more precise movements and positioning of the surgical tool than those performed with known techniques.

SUMMARY OF THE INVENTION

To this end, firstly, a control unit for a surgical device is proposed, said surgical device comprising:
at least one surgical tool comprising an end, called distal, adapted to come into contact with a patient, and adapted to be positioned in the patient,
at least one robotic mobile element on which the surgical tool is mounted, the robotic mobile element being adapted to move said surgical tool,
at least one depth imaging tool adapted to acquire at least one depth image at an acquisition area on the patient, said imaging tool being adapted to move the acquisition area on the patient,
said control unit being adapted to send information to the at least one robotic mobile element and/or the imaging tool so that the position of the acquisition area substantially coincides with the position of the distal end of the surgical tool.

Advantageously, the control unit allows to reduce the number of simultaneous manipulations of the surgeon. It also allows to limit the consequences that an unwanted movement could have on a patient and to perform more precise movements and positioning of the surgical tool than those performed by known techniques.

Secondly, a surgical device is proposed comprising:
at least one surgical tool comprising an end, called distal, adapted to come into contact with a patient, and adapted to be positioned in the patient,
at least one robotic mobile element on which the surgical tool is mounted, the robotic mobile element being adapted to move said surgical tool,
at least one depth imaging tool adapted to acquire a depth image at an acquisition area on the patient, said imaging tool being adapted to move the acquisition area on the patient,
a control unit as previously described.

Various additional characteristics may be provided alone or in combination:
the imaging tool is adapted to acquire a first depth image according to a first cutting axis, called horizontal, and a second depth image according to a second cutting axis, called vertical, the cutting axes intersecting at an intersection point, and wherein the control unit is adapted to send information to the robotic mobile element and/or the imaging tool so that the position of the intersection point substantially coincides with the position of the distal end of the surgical tool;

the surgical device comprises a tool for controlling the robotic mobile element, the control tool being adapted to send information to the control unit;

the robotic mobile element is a robotic mobile arm;

the intersection point is adapted to be moved, and wherein the control unit is adapted to send information to the robotic mobile element such that the distal end of the surgical tool substantially coincides with the intersection point in real time;

the intersection point is adapted to be moved, and wherein the control unit is adapted to send information to the imaging tool so that the intersection point substantially coincides with the distal end of the surgical tool in real time;

the intersection point is adapted to be moved to a given position, and wherein the control unit is adapted to send information to the robotic mobile element so that the distal end of the surgical tool substantially coincides with the intersection point when said intersection point is positioned at said given position;

the robotic mobile element is adapted to be moved, and wherein the control unit is adapted to send information to the robotic mobile element so that the distal end of the surgical tool substantially coincides with the intersection point in real time;

the surgical device comprises a surgical microscope adapted to acquire a two-dimensional microscopic image of an anatomical surface, said microscopic image comprising the acquisition area and the cutting axes of the depth imaging tool, said microscopic image being projected onto the screen;

the surgical device is adapted to display on the OCT image a position of the surgical tool;

the surgical device is adapted to display on the microscopic image a position of the surgical tool.

Thirdly, a method of operating a surgical device as previously described is proposed, said method comprising the following steps:

a step of sending a displacement instruction to the control tool, a step of acquiring, by the control unit, the displacement instruction of the robotic mobile element or of the acquisition area of the imaging system, a step in which a command is sent to the robotic mobile element or the acquisition area so as to move the surgical tool or the acquisition area so that the position of the acquisition area substantially coincides with the position of the end of the surgical tool.

Various additional characteristics may be provided alone or in combination:

the method comprises an initial registration operation for calibrating the surgical device, said registration operation allowing the control unit to calculate a transformation matrix allowing to transform any point in the coordinate system of the depth images and the microscopic image into a position in the coordinate system of the robotic mobile element and vice versa;

the registration operation comprises:

a first step in which the surgical tool is moved in a microscopic image, so that a distal end of said surgical tool is visible in said microscopic image, a second step in which the position of the distal end is identified manually or automatically in the microscopic image, a third step in which the position of the acquisition area is updated so that said acquisition area coincides with the distal end of the surgical tool, a fourth step in which the depth coordinate of the distal end is identified manually or automatically on at least one OCT image, method in which the registration operation is performed several times for different positions of the distal end, preferably three times.

BRIEF DESCRIPTION OF FIGURES

Further characteristics and advantages of the invention will become apparent from the following description in relation to the attached drawings, which are given as non-limiting examples:

FIG. 1 is a schematic representation of a surgical device according to the invention;

FIG. 2 is a schematic representation of the surgical device in use;

FIG. 3 is a schematic representation of an eye on which a surgical procedure is performed;

FIG. 4a is an image of a surgical procedure;

FIG. 4b is an image of a surgical procedure;

FIG. 4c is an image of a surgical procedure;

FIG. 5 is a schematic representation of a method of operating the surgical device according to the invention;

FIG. 6 is an real image of a surgical procedure in which the position of a surgical tool is added by software.

DETAILED DESCRIPTION OF THE INVENTION

In the following detailed description, the particular, non-limiting case of using an imager to obtain an OCT image is described.

FIG. 1 shows a control unit 1 for a surgical device 2.

In the embodiment shown in the figures, the surgical device 2 is adapted to and intended to perform surgical interventions on an eye 6.

The surgical device 2 comprises a surgical tool 3 comprising an end 4, called distal, intended to come into contact with a patient 5, and more precisely adapted to be positioned at least deep into the eye 6 of a patient 5.

The surgical device 2 comprises at least one robotic mobile element 7 on which the surgical tool 3 is mounted. The robotic mobile element 7 is adapted to move the surgical tool 3. In the embodiment shown in the figures, the mobile element 7 is a mobile arm.

The surgical device 2 comprises an OCT imager 8 adapted to acquire a depth image at an acquisition area 9 on the patient 5. The OCT imager 8 is capable of moving the acquisition area 9 on the patient 5. The images obtained from the OCT imager 8 are referred to hereinafter as "OCT images 22". The surgical device 2 comprises a surgical microscope 10, adapted to acquire an image of an anatomical surface such as the retina of the eye 6 for example. In the embodiment shown in the figures, the surgical microscope 10 is an ophthalmic microscope. The ophthalmic microscope 10 is co-located with the OCT imager 8 in a single imaging device 11 visible in FIG. 2. The images obtained from the ophthalmic microscope 10 are microscopic images which will be referred to in the following as "ophthalmoscopic images 21". The acquisition area 9 is in the form of a square with several cutting axes 12, 13 running through it, as shown in FIG. 4*a*. In this figure, a horizontal cutting axis 12 and a vertical cutting axis 13 are visible, which intersect at an intersection point 14. FIG. 4*b* shows the anatomical structures of a retina according to the horizontal cutting axis 12 and FIG. 4*c* shows the anatomical structures of the retina according to the vertical cutting axis 13.

The control unit 1 is adapted to send information 25 to the robotic mobile element 7 and/or information 26 to the OCT imager8 so that the position of the vertical cutting axis 13 and the horizontal cutting axis 12 coincide with the position of the distal end 4 of the surgical tool 3. In other words, the intersection point 14 coincides with the distal end 4. For this purpose, the control unit 1 is adapted to receive information 23 on the position of the robotic mobile element 7, these positional information 23 coming from said robotic mobile element. The control unit 1 is also adapted to receive data 24 from the OCT and ophthalmic images 22, 21 respectively from the OCT imager 8 and the ophthalmic microscope 10 and send positioning information 26 to the OCT imager.

The surgeon 19 does not intervene directly on the patient 5, but on a control tool 15 visible on FIG. 2. Thus, the surgical device 2 also comprises a control tool 15 adapted to send information 27 about the displacement of the robotic mobile element to the control unit 1. In the embodiment shown in the figures, the control tool 15 is a control stylus.

Before starting each surgical procedure, an initial registration operation is performed outside the patient. The registration operation consists of calibrating the surgical device 2 so that the control unit 1 knows the position of the surgical tool 3 with respect to the cutting axes 12, 13.

For this purpose, the control unit 1 comprises a storage unit 16 in which a transformation matrix is stored. The transformation matrix allows the positions of the cutting axes 12, 13 and the depth in the OCT images 22 to be synchronised with the position of the robotic mobile element 7.

Two initial registration operations can be used. The first registration operation is performed by following successive steps, described below.

In a first step the surgical tool 3 carried by the robotic mobile element 7 is moved into the field of the ophthalmic microscope 10, i.e. so that the distal end 4 is visible in the ophthalmoscopic image 21, this being done with the help of the control tool 15. In a second step, the surgeon 19 identifies the position of the distal end 4 in the ophthalmoscopic image 21. This step can be performed automatically or manually. Automatically, the control unit 1 may detect the distal end 4 of the surgical tool 3 on the ophthalmoscopic image 21 and determine the coordinates according to the two dimensions (x, y) of said distal end 4. In manual mode, the distal end 4 is visible on the screen 20. The surgeon 19, selects the distal end 4 with a mouse, touchpad, joystick or any other human machine interaction (HMI) means. The selection is made on the ophthalmoscopic image 21 of FIG. 4*a* to obtain the coordinates (x, y). In a third step, the control unit 1 updates the position of the acquisition area 9 and the cutting axes 12, 13 so that the two cutting axes 12, 13 coincide with the distal end 4 of the surgical tool 3. Thus, the distal end 4 of the surgical tool 3 is located at an intersection of the two cutting axes 12, 13. In a fourth step the surgeon selects the distal end 4 on one of the two cutting axes to obtain the coordinate in z. This step can be performed automatically or manually. Automatically, the control unit 1 can detect the distal end 4 of the surgical tool 3 on the OCT image and thus determine the coordinate in z.

For cases where the ophthalmoscopic image 21 and the two cutting axes 12, 13 have no distortion, one point may be sufficient. In this case, the registration between the robot and the image is based on a rigid registration algorithm. If, on the other hand, a distortion exists in the image, several points should be acquired, preferably with one point in the centre of the acquisition area 9 and several points in the peripheral parts of the acquisition area 9. The registration between the robot and the image is in this case based on a non-rigid registration algorithm. The more points there are, the better the accuracy. To guide the user, the control unit 1 can display a Root Mean Squared (RMS) error value following each added point which gives an indication of the accuracy with that number of points.

Once the registration is complete, the control unit 1 calculates a transformation matrix using a standard registration algorithm. The transformation matrix transforms any point in the coordinate system of the OCT image and the ophthalmoscopic image into a position in the coordinate system of the robotic mobile element and vice versa.

Depending on the choice of the surgeon, a second registration operation, different from the first registration operation, can be used. In a first step the surgical instrument carried by the robot is moved into the acquisition area of the OCT imager, which is in the field of the ophthalmic microscope as in the first registration process. In a second step, the horizontal cutting axis is moved towards the end of the surgical instrument until said end is visible in the OCT image displayed on the screen. The surgeon indicates to the control unit the position of the end of the surgical tool when he sees it on the OCT image. This operation is also performed with the vertical cutting axis subsequently. As with the first process, this operation must be repeated several times to obtain a sufficiently small RMS error for the target application.

Once the registration operation is completed, the surgeon can direct the robotic mobile element using the control tool while the OCT imager moves the acquisition area and the horizontal and vertical cutting axes so that the intersection point coincides with the position of the distal end of the surgical tool. Conversely, the surgeon can select a point on the imagery, and the control unit instructs the robotic mobile element to move so that the distal end of the surgical tool coincides with that point.

When the registration operation is complete, the method of operating the surgical device comprises a step 17 of sending a displacement instruction using the control tool 15. The method then comprises a step 18 of acquiring an instruction for moving the robotic mobile element or the acquisition area of the imaging tool and a step 19 in which a command is sent to the robotic mobile element or the acquisition area so as to move the surgical tool or the acquisition area so that the position of the acquisition area substantially coincides with the position of the end of the surgical tool. A command is a set of instructions or a single instruction. The method of operating the surgical device may be performed outside the patient. In other words, the operation method may be performed when no element of the surgical device is in contact with the patient.

Advantageously, the device is adapted to display a position 23 of the instrument on the OCT image 22. With reference to FIG. 6, it can be seen that the surgical tool 3 is displayed superimposed on the OCT image 22. This advantageously allows the practitioner to check the accuracy of the registration. Indeed, he can then ensure that the surgical tool 3 coincides with the position 23 drawn on the OCT image 22.

Several different uses of the surgical device are possible. These uses are described below.

First Option: Servo-Control of the Position of the OCT Imager

According to a first possible use of the surgical device, the surgeon moves the robotic mobile element with the help of the control tool. The control unit instructs the OCT imager to move the acquisition area and the vertical and horizontal cutting axes so that the intersection point coincides with the distal end of the surgical tool.

This allows the surgeon to visualise the anatomical structures and the distal end of the surgical tool on the screen in real time.

Second Option: Servo-Control of the Position of the Surgical Tool

According to a second possible use of the surgical device, the surgeon moves the acquisition area and consequently the horizontal and vertical cutting axes. Thus the surgeon can visualise an anatomical location in depth and then decide to intervene. When he decides to intervene, he indicates to the control unit to move the distal end of the surgical device to the coordinate point corresponding to the intersection of the horizontal and vertical cutting axes (x, y) and to a point in depth indicated on the OCT image (z). Alternatively, the robotic mobile element moves instantaneously by following in real time a point defined on the microscopic and OCT images. This point can be an anatomical landmark identified by the surgeon and which moves as a result of the movements of the patient (breathing, heartbeat). The movement of this landmark is calculated by the control unit based on the microscopic image and/or the OCT images using a tracking algorithm.

This enables to perform high-precision surgeries with the robotic mobile element moving to an anatomical location selected by the surgeon. This use is particularly useful when the distal end of the surgical tool needs to be placed in the centre of a retinal vessel, the diameter of which may be less than 10 µm or when said distal end needs to be positioned at a precise depth below the surface of the retina to perform a subretinal injection for example. Indeed, this type of intervention is extremely difficult because no abrupt movement or shaking is allowed. Indeed, the natural tremor of a surgeon is of the order of 100 µm whereas the intervention is carried out on a few micrometres.

Third Option: Definition of Forbidden Areas on the OCT Image

According to a third possible use of the surgical device, it is possible to define no-go areas where the distal end of the surgical tool cannot reach.

On the OCT images and on the ophthalmoscopic image, the surgeon defines restricted areas on the screen so that the control unit prohibits the access of the distal end to said restricted areas. This ensures the safety of the patient by protecting specific anatomical areas from sudden unwanted movement or shaking of the surgeon.

Fourth Option: Setting an Automatic Scan

According to a fourth possible use of the surgical device, it is possible to define a three and/or two-dimensional path on the screen using the OCT images and/or the ophthalmoscopic image. Once the path has been drawn and validated, the control unit instructs the surgical device to follow the path. This allows surgical procedures to be performed along complex paths with precise and controlled movement, for example for laser treatment of the retina. In this application, the surgical device is for example an intraocular laser transmitter.

The use of an OCT imaging technique described in the above particular case is not limiting to the invention. Any type of imagery that provides a depth image of a slice can be used. This comprises, for example, the ultrasound, SM-OCT (Speckle-Modulating OCT), SS-OCT (Swept-Source OCT), SD-OCT (Spectral-Domain OCT) or OCTA (OCT Angiography) techniques.

The invention claimed is:

1. A control unit for a surgical device, said surgical device comprising:
   at least one surgical tool comprising a distal end configured to come into contact with a patient, and configured to be positioned in the patient,
   at least one robotic mobile element on which the at least one surgical tool is mounted, the at least one robotic mobile element being configured to move said at least one surgical tool,
   at least one depth imaging tool configured to acquire at least one depth image at an acquisition area on the patient, said at least one depth imaging tool being configured to move the acquisition area on the patient,
   a control tool configured to send information to the control unit about a move of said at least one robotic mobile element and/or said at least one depth imaging tool,
   said control unit being configured to receive information from the control tool and to control the move of said at least one robotic mobile element and/or said at least one depth imaging tool so that the position of the acquisition area substantially coincides with the position of the distal end of the at least one surgical tool,
   said control unit being configured to receive positional information coming from said at least one robotic mobile element and information coming from said at least one depth imaging tool.

2. A surgical device comprising:
   at least one surgical tool comprising a distal end configured to come in contact with a patient, and configured to be positioned in the patient,
   at least one robotic mobile element on which the at least one surgical tool is mounted, the at least one robotic mobile element being configured to move said at least one surgical tool,
   at least one depth imaging tool configured to acquire a depth image at an acquisition area on the patient, said at least one depth imaging tool being configured to move the acquisition area on the patient,
   a control tool configured to order a move of said at least one robotic mobile element and/or said at least one depth imaging tool,
   a control unit according to claim 1.

3. The surgical device according to claim 2 wherein the intersection point is configured to be moved, and wherein the control unit is configured to send information to the at least one robotic mobile element such that the distal end of the at least one surgical tool substantially coincides with the intersection point in real time.

4. The surgical device according to claim 2 in which the at least one depth imaging tool is configured to acquire a first depth image according to a first cutting axis and a second depth image according to a second cutting axis, the first cutting axis and the second cutting axis intersecting at an intersection point, and wherein the control unit is configured to send information to the at least one robotic mobile element and/or the at least one depth imaging tool so that the position of the intersection point substantially coincides with the position of the distal end of the at least one surgical tool.

5. The surgical device according to claim 4 wherein the intersection point is configured to be moved, and wherein the control unit is configured to send information to the at least one depth imaging tool so that the intersection point substantially coincides with the distal end of the at least one surgical tool in real time.

6. The surgical device according to claim 2 wherein the at least one robotic mobile element is a robotic mobile arm.

7. The surgical device according to claim 6 wherein the intersection point is configured to be moved to a given position, and wherein the control unit is configured to send an information to the at least one robotic mobile element so that the distal end of the at least one surgical tool substantially coincides with the intersection point when said intersection point is positioned at said given position.

8. The surgical device according to claim 6 wherein the at least one robotic mobile element is configured to be moved, and wherein the control unit is configured to send information to the at least one robotic mobile element such that the distal end of the at least one surgical tool substantially coincides with the intersection point in real time.

9. The surgical device according to claim 6 wherein it comprises a surgical microscope configured to acquire a two-dimensional microscopic image of an anatomical surface, said two-dimensional microscopic image comprising the acquisition area and the first cutting axis and the second cutting axis of the at least one depth imaging tool, said microscopic image configured for being projected onto a screen.

10. The surgical device according to claim 9 wherein it is configured to display on an OCT image, a position of the at least one surgical tool.

11. The surgical device according to claim 10 wherein it is configured to display on a microscopic image, a position of the at least one surgical tool.

12. A method of operating a surgical device according to claim 11, said method, performed outside the patient, comprising the following steps:
    a step of sending a displacement instruction to the control tool,
    a step of acquiring, by the control unit, the displacement instruction of the at least one robotic mobile element or of the acquisition area of the at least one depth imaging tool,
    a step in which a command is sent to the at least one robotic mobile element or the acquisition area so as to move the at least one surgical tool or the acquisition area so that the position of the acquisition area substantially coincides with the position of the end of the at least one surgical tool.

13. The operating method according to claim 12 wherein it comprises an initial registration operation for calibrating the surgical device, said registration operation allowing the control unit to calculate a transformation matrix allowing to transform each point in the coordinate system of the depth images and the microscopic image into a position in the coordinate system of the at least one robotic mobile element and vice versa.

14. The operating method according to claim 13 wherein the registration operation comprises:
    a first step in which the at least one surgical tool is moved in the two-dimensional microscopic image, so that a distal end of said at least one surgical tool is visible in said two-dimensional microscopic image,
    a second step in which the position of the distal end is identified manually or automatically in the microscopic image,
    a third step in which the position of the acquisition area is updated so that said acquisition area coincides with the distal end of the at least one surgical tool,
    a fourth step in which the depth coordinate of the distal end is identified manually or automatically on at least one OCT image,
    method in which the registration operation is performed several times for different positions of the distal end.

15. The operating method according to claim 14 wherein the registration operation is performed three times.

16. The surgical device according to claim 1 wherein it is configured to display a depth image obtained by ultrasound, SM-OCT, SS-OCT, SDOCT or OCTA.

* * * * *